(12) United States Patent
Zhang et al.

(10) Patent No.: US 12,652,583 B2
(45) Date of Patent: *Jun. 9, 2026

(54) APPARATUS, SYSTEM AND METHOD FOR DC (DUAL CONNECTIVITY)

(71) Applicant: NEC Corporation, Tokyo (JP)

(72) Inventors: Xiaowei Zhang, Tokyo (JP); Anand Raghawa Prasad, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/804,473

(22) Filed: Aug. 14, 2024

(65) Prior Publication Data

US 2025/0008383 A1      Jan. 2, 2025

Related U.S. Application Data

(63) Continuation of application No. 18/204,770, filed on Jun. 1, 2023, now Pat. No. 12,096,287, which is a
(Continued)

(30) Foreign Application Priority Data

Mar. 10, 2014      (JP) ................................. 2014-046158

(51) Int. Cl.
*H04W 36/00* (2009.01)
*H04W 88/06* (2009.01)

(52) U.S. Cl.
CPC ... *H04W 36/0038* (2013.01); *H04W 36/0058* (2018.08); *H04W 36/0069* (2018.08); *H04W 36/00695* (2023.05); *H04W 88/06* (2013.01)

(58) Field of Classification Search
CPC ......... H04W 36/0069; H04W 36/0038; H04W 36/0058; H04W 88/06
See application file for complete search history.

(56) References Cited

U.S. PATENT DOCUMENTS

| | | |
|---|---|---|
| 2013/0324114 A1 | 12/2013 | Raghothamen et al. |
| 2016/0157095 A1 | 6/2016 | Zhang ............... H04W 72/0406 |
| | | 380/273 |

(Continued)

FOREIGN PATENT DOCUMENTS

| | | |
|---|---|---|
| GB | 2519975 A | 5/2015 |
| JP | 2014-7500 A | 1/2014 |

(Continued)

OTHER PUBLICATIONS

Communication dated Mar. 20, 2018 from the Japanese Patent Office in counterpart application No. 2017-022335.

(Continued)

*Primary Examiner* — Jackie Zuniga Abad
(74) *Attorney, Agent, or Firm* — Dickinson Wright, PLLC

(57) ABSTRACT

A UE (10) provides information on potential S'eNB(s). The information is forwarded from an MeNB (20_1) to an M'eNB (20_2) such that the M'eNB (20_2) can determine, before the handover happens, whether the M'eNB (20_2) will configure a new SeNB (S'eNB) and which S'eNB the M'eNB (20_2) will configure. In one of options, the MeNB (20_1) derives a key S'-KeNB for communication protection between the UE (10) and the S'eNB (30_1), and send the S'-KeNB to the M'eNB (20_2). In another option, the M'eNB (20_2) derives the S'-KeNB from a key KeNB* received from the MeNB (20_1). The M'eNB (20_2) sends the S'-KeNB to the S'eNB (30_1). Moreover, there are also provided several variations to perform SeNB Release, SeNB Addition, Bearer Modification and the like, in which the order and/or timing thereof can be different during the handover procedure.

4 Claims, 9 Drawing Sheets

Related U.S. Application Data continuation of application No. 17/568,779, filed on Jan. 5, 2022, now Pat. No. 11,711,736, which is a continuation of application No. 16/388,084, filed on Apr. 18, 2019, now Pat. No. 11,284,317, which is a continuation of application No. 15/124,406, filed as application No. PCT/JP2015/001122 on Mar. 3, 2015, now Pat. No. 10,321,362.

(56)                    References Cited

U.S. PATENT DOCUMENTS

| | | | |
|---|---|---|---|
| 2016/0192245 A1* | 6/2016 | He | H04W 36/0055 |
| | | | 370/331 |
| 2016/0242064 A1 | 8/2016 | Lee | H04W 56/0005 |
| 2016/0277987 A1 | 9/2016 | Chen | H04W 76/15 |
| 2016/0337925 A1 | 11/2016 | Fujishiro | H04W 36/165 |
| 2017/0181044 A1 | 6/2017 | Wen | H04W 36/0005 |

FOREIGN PATENT DOCUMENTS

| | | |
|---|---|---|
| WO | 2010/116621 A1 | 10/2010 |
| WO | 2014/010864 A1 | 1/2014 |
| WO | 2014/021761 A2 | 2/2014 |

OTHER PUBLICATIONS

3GPP TR 36.842, "Study on Small Cell enhancements for E-UTRA and E-UTRAN; Higher layer aspects (Release 12)", V12.0.0, Dec. 2013.

Ericsson, "SCE Discussions in SA3#74", 3GPP TSG SA WG3 (Security) Meeting #74, S3-140211, Jan. 20-24, 2014.

SA3, "Reply LS on security aspects of protocol architectures for small cell enhancements", 3GPP TSG SA WG3 (Security) Meeting #74, S3-140208, Jan. 20-24, 2014.

SA3, "Response to SP-130720; Reply LS on Small Cell Enhancement work in RAN", 3GPP TSG SA WG3 (Security) Meeting #74, S3-140210, Jan. 20-24, 2016.

NSN et al: "SeNB change and inter-MeNB handover procedure", 3GPP Draft; R3-140424 WAS R3-140186, 3GPP TSG RAN WG3 Mesting #83, Feb. 10-14, 2014.

Kyocera: "Handover enhancements with dual connectivity", 3GPP Draft; R2-140698, 3GPP TSG RAN WG2 #85, Feb. 10-14, 2014.

Ericsson, "Mobility procedures for dual connectivity", 3GPP Draft; R2-140642, 3GPP TSG RAN WG2 #85, Feb. 10-14, 2014.

International Search Report for PCT/JP2015/001122 dated May 27, 2015.

Alcatel-Lucent, "Mobility scenarios for dual connectivity support," 3GPP TSG RAN WG2 Meeting #88; Prague, Czech Republic, Feb. 10-14, 2014; R2-140743 (7 pages total).

Samsung, "SGC user plane security in 1A, " 3GPP TSG RAN WG2 #85: Feb. 10 to 14, 2014, Prague, Czech Republic; R2-140819 (4 pages total).

NEC, "PCell change in dual connectivity," 3GPP TSG RAN2 Meeting #85, Prague, Czech Republic, Feb. 10-14, 2014; R2-140511 (2 pages total).

Samsung, "SCE signalling flows, discussion of remaining issues," 3GPP TSG-RAN2 #85 meeting: Prague, Czech Republic, Feb. 10-14, 2014; R2-140588 (7 pages total).

Communication dated Oct. 25, 2016 from the Japanese Patent Office in counterpart application No. 2016-535201.

CATT, "Consideration of MGC handover for Dual Connectivity," 3GPP TSG RAN WG2#85; Prague, Czech Republic, Feb. 10-14, 2014; R2-140189 (4 pages total).

Communication dated Dec. 13, 2016 from the Japanese Patent Office in counterpart application No. 2016-535201.

Communication dated Jun. 20, 2019, Issued by the Korean Intellectual Property Office in corresponding Korean Application No. 10-2019-7010471.

CMCC, "Handling of MeNB HO and SeNB change for dual connectivity operaation", 3GPP TSG-RAN WG2 Meeting #85, Prague, Czech Republic, Feb. 10-14, 2014, R2-140135, pp. 1-7 (7 pages total).

ZTE Corporation, "Discussion on handover procedure for small cell", 3GPP TSG-RAN WG2 Meeting #85, Prague, Czech, Jan. 10-14, 2014 R2-140114 (6 pages total).

Communication dated Dec. 17, 2019 from the Intellectual Property Office of India in Application No. 201617030604.

NSN et al., "Handover procedure in case of bearer only served by SeNB (1A)", 3GPP TSG-RAN WG3 Meeting #82, Nov. 11-15, 2013, R3-132101 (total 13 pages).

Communication dated May 21, 2020 from the Korean Intellectual Property Office in Application No. 10-2020-7012248.

Indian Office Communication for IN Application No. 201617030604 mailed on Jun. 2, 2022 with English Translation.

* cited by examiner

[Fig. 1]
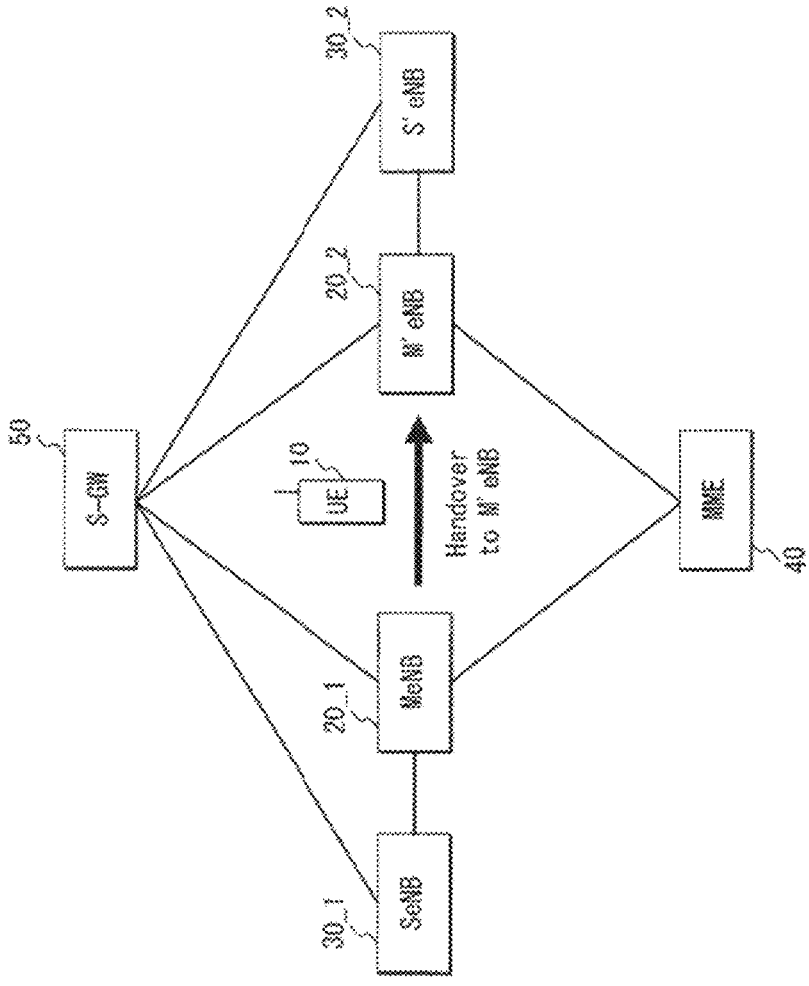

[Fig. 2]
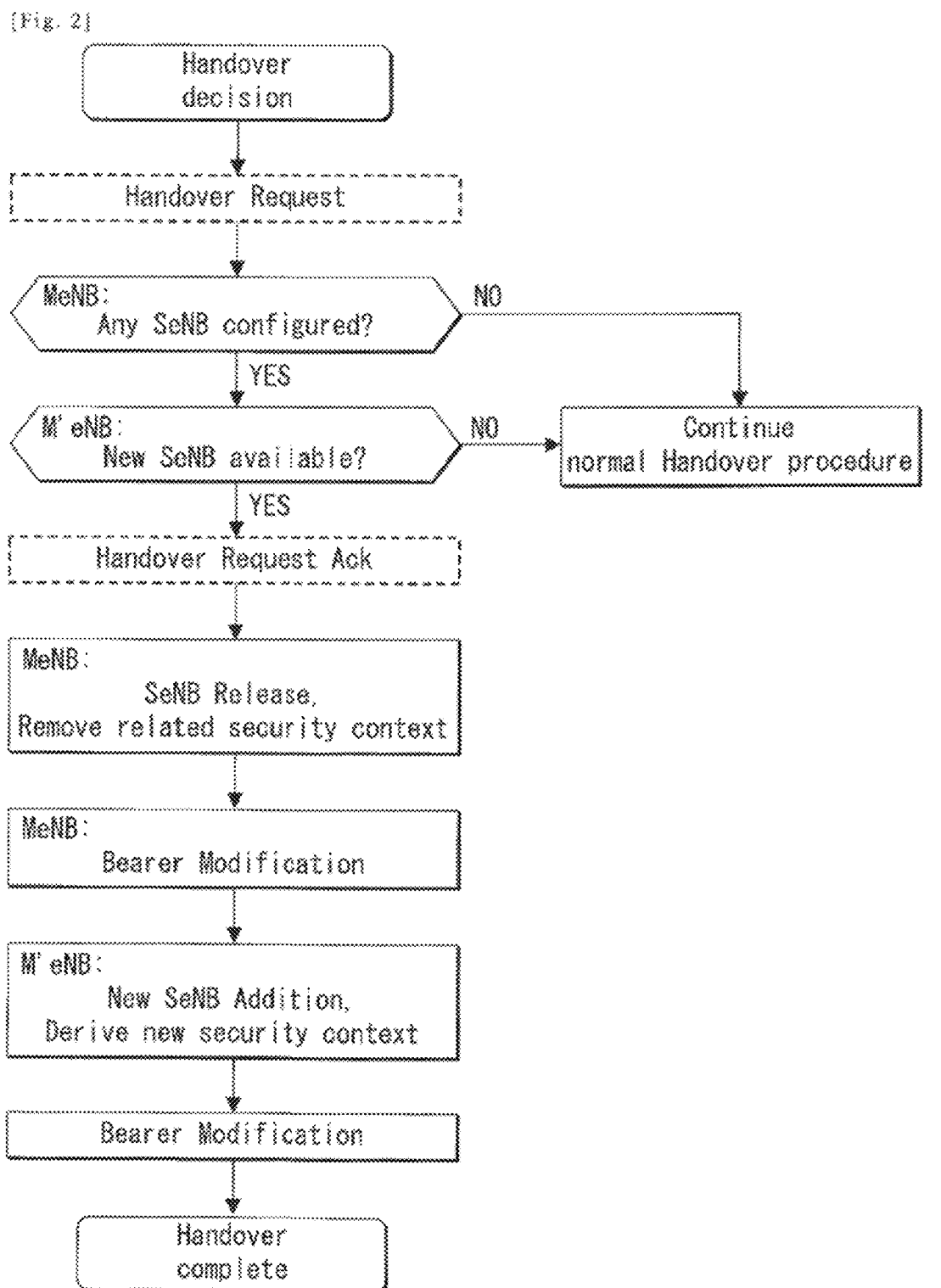

[Fig. 3]
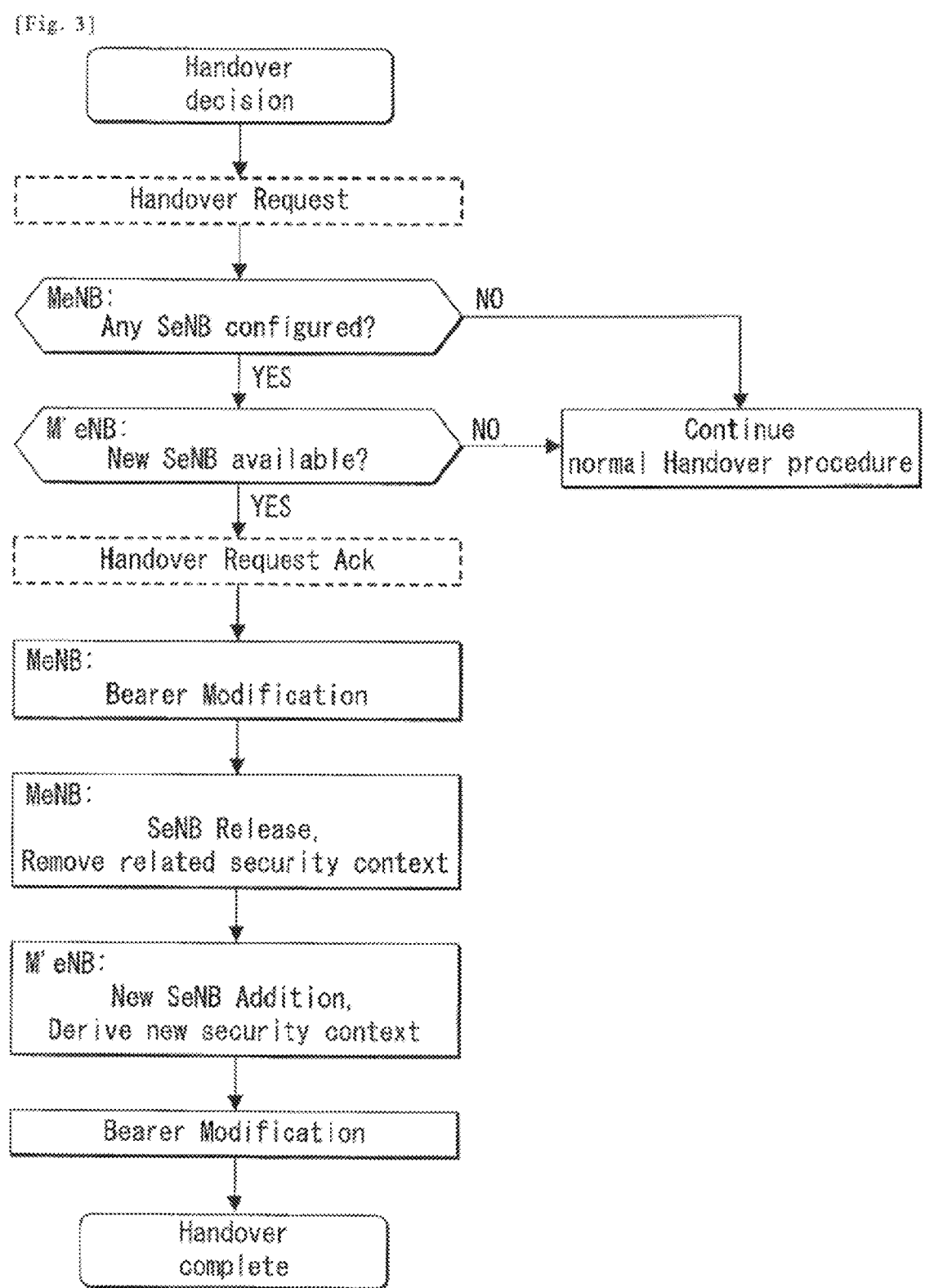

[Fig.4]

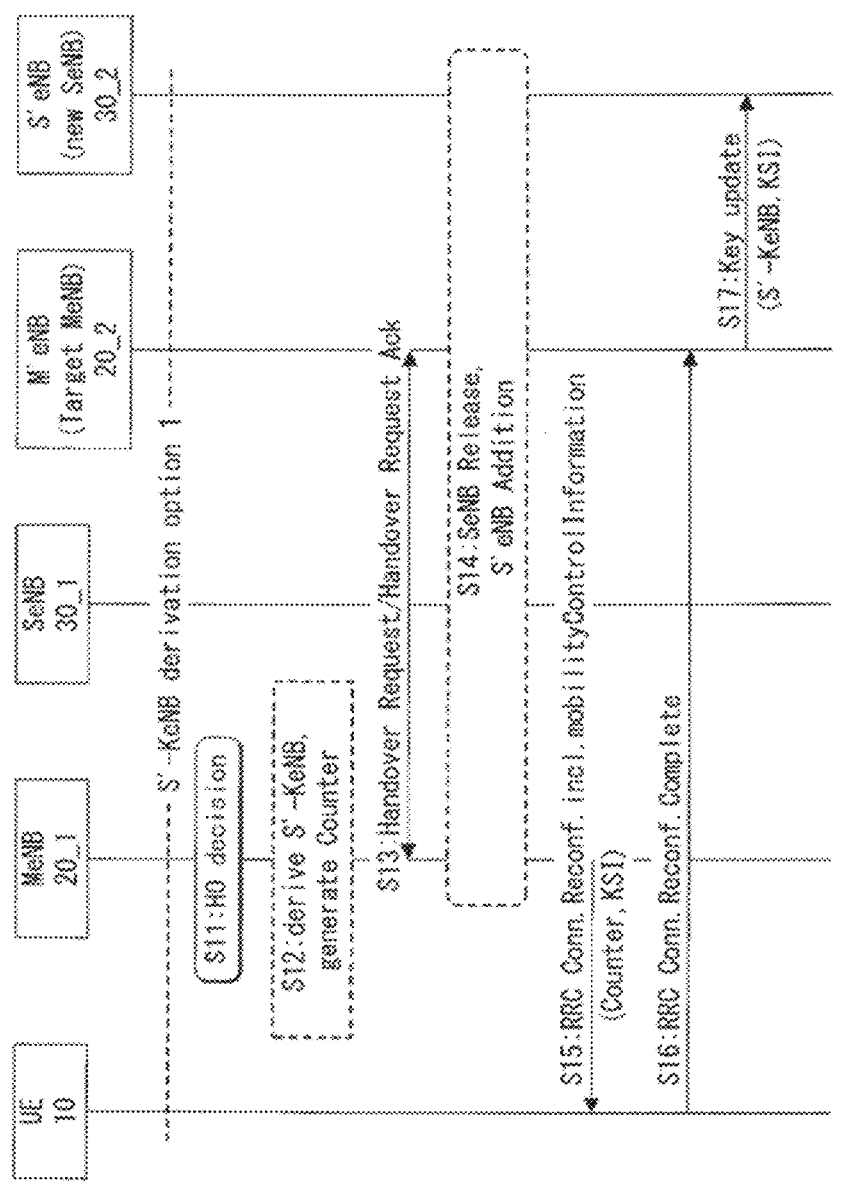
[Fig. 5]

[Fig. 6]
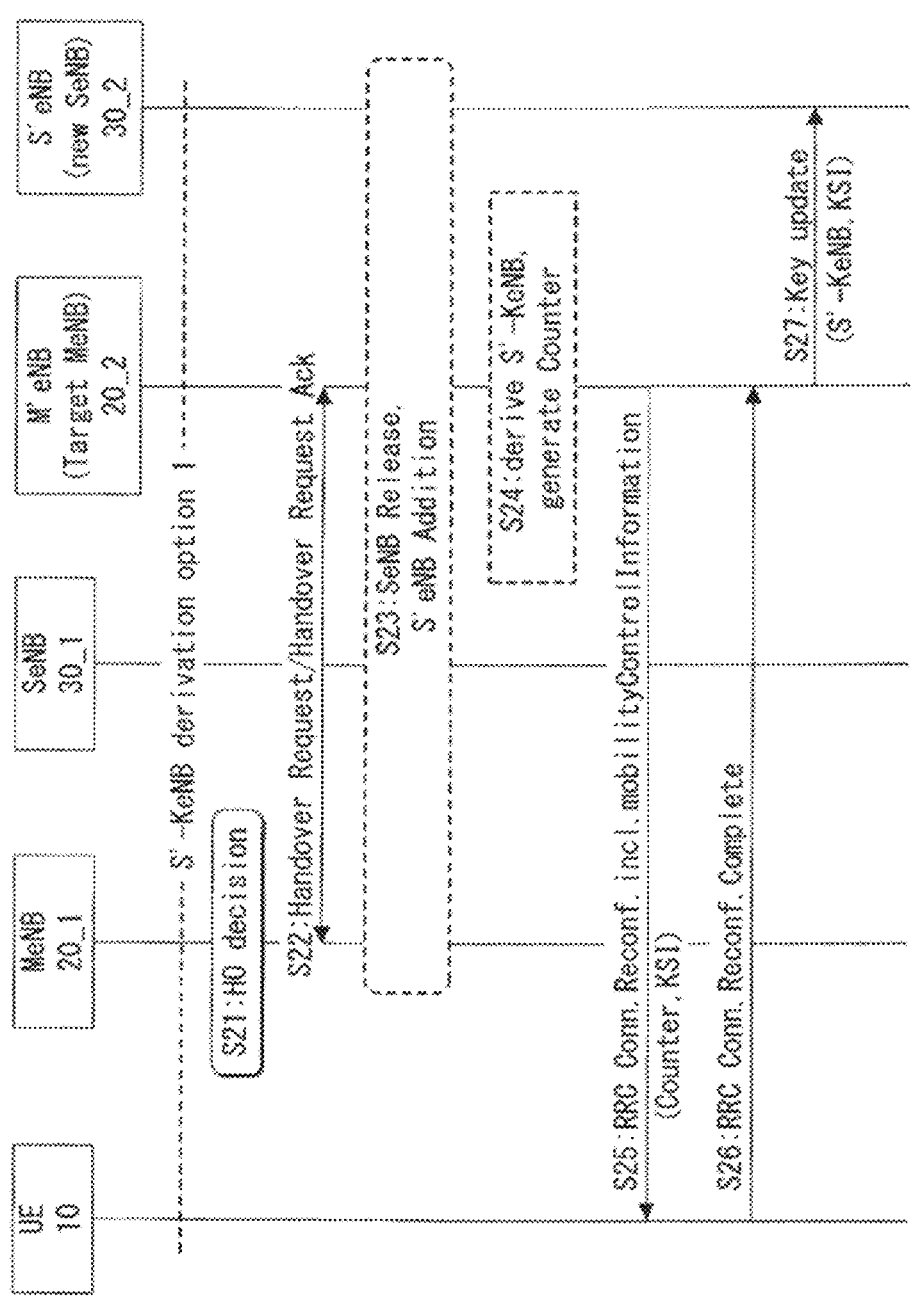

[Fig. 7]
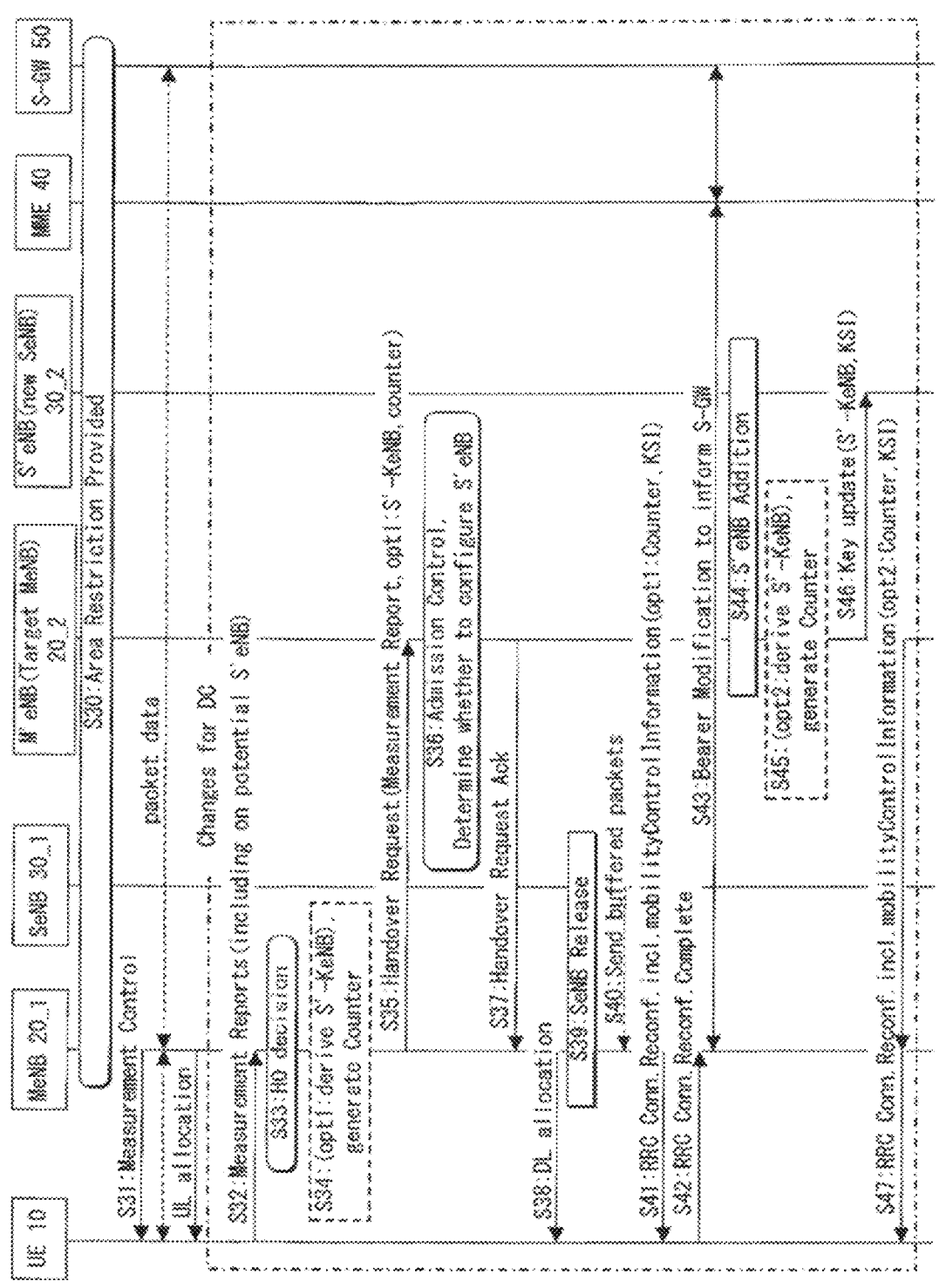

[Fig. 8]
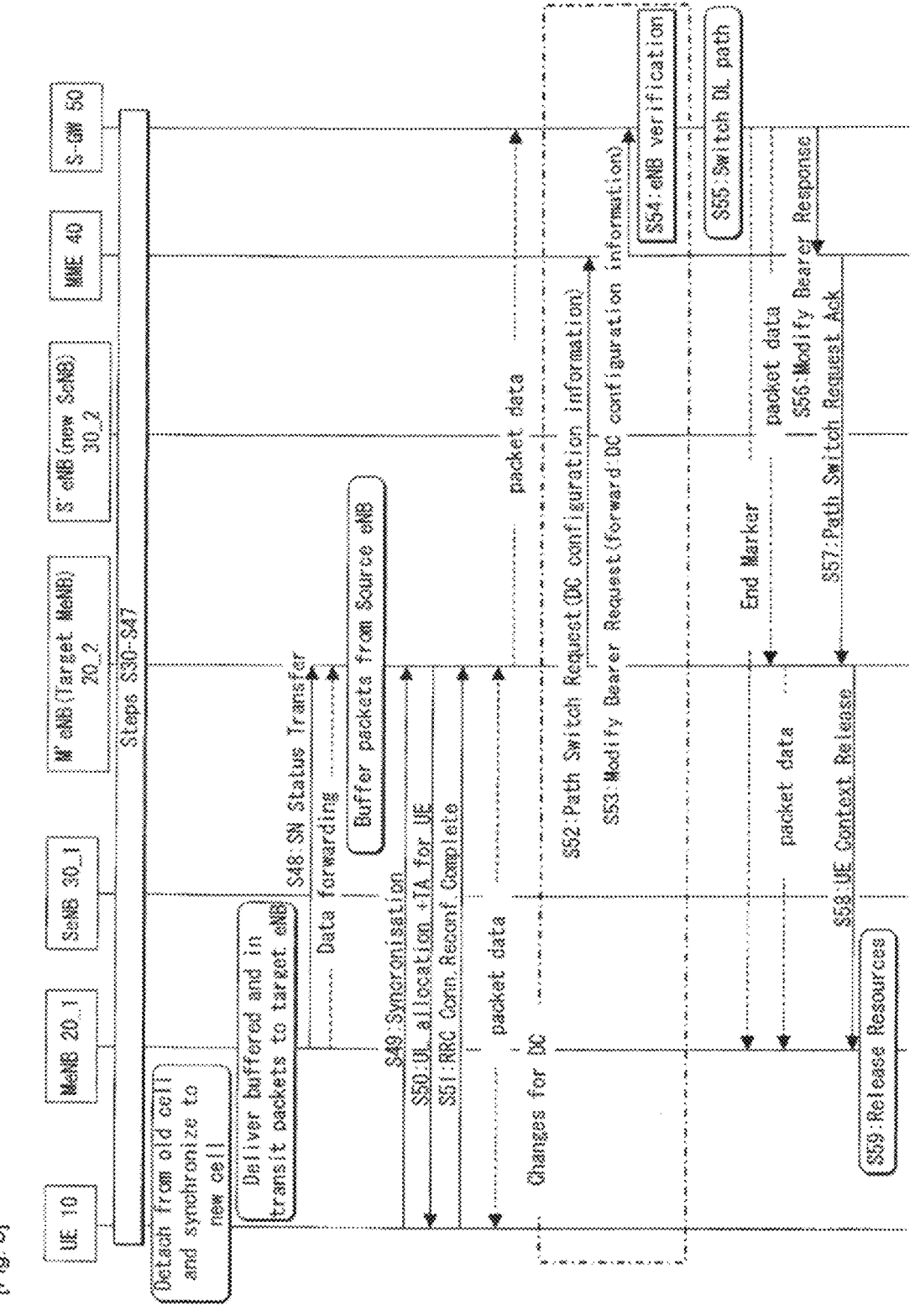

[Fig. 9]
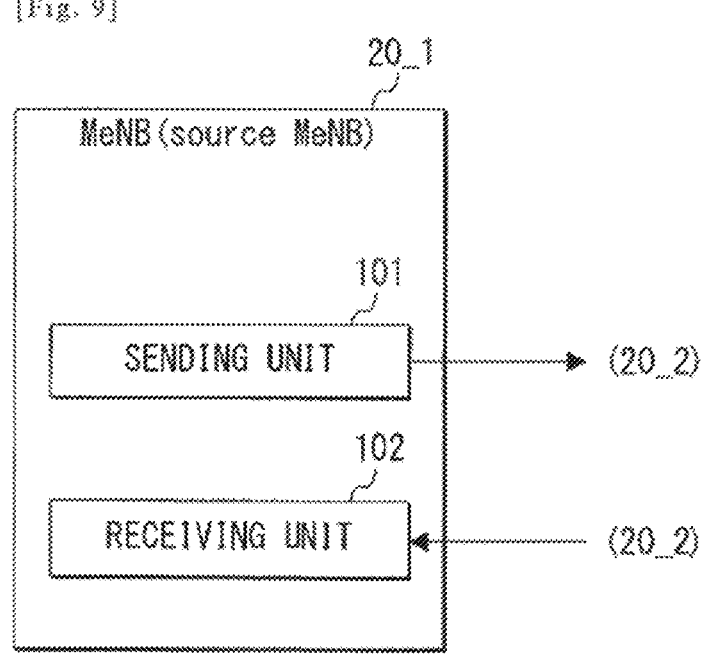
[Fig. 10]
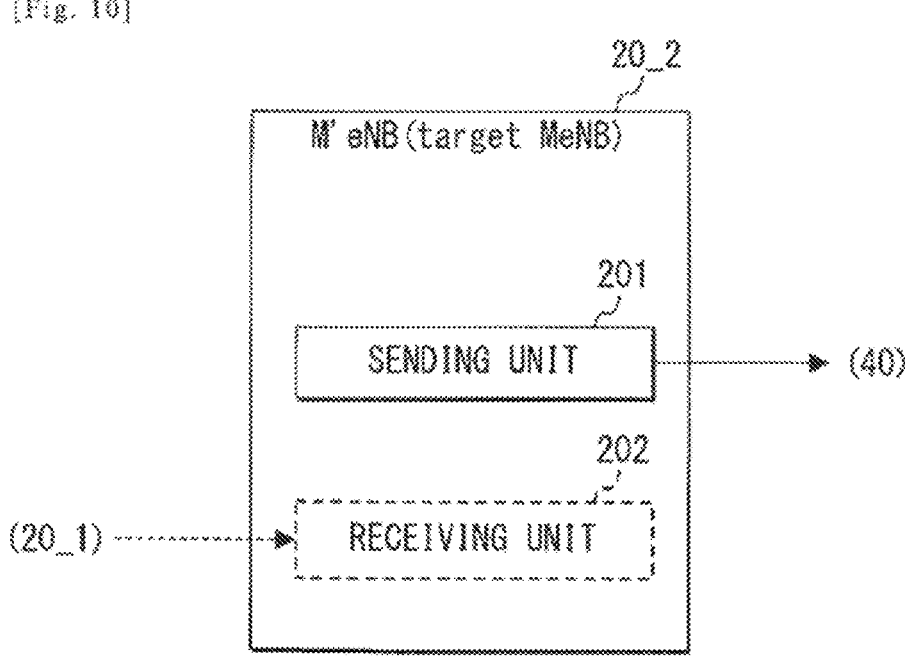

APPARATUS, SYSTEM AND METHOD FOR DC (DUAL CONNECTIVITY)

CROSS REFERENCE TO RELATED APPLICATIONS

The present application is a Continuation application of U.S. patent application Ser. No. 18/204,770 filed on Jun. 1, 2023, which is a Continuation application of U.S. patent application Ser. No. 17/568,779 filed on Jan. 5, 2022, which issued as U.S. Pat. No. 11,711,736, which is a Continuation application of U.S. patent application Ser. No. 16/388,084 filed on Apr. 18, 2019, which issued as U.S. Pat. No. 11,284,317, which is a Continuation application of U.S. patent application Ser. No. 15/124,406 filed on Sep. 8, 2016, which issued as U.S. Pat. No. 10,321,362, which is a National Stage of International Application No. PCT/JP2015/001122 filed on Mar. 3, 2015, claiming priority based on Japanese Patent Application No. 2014-046158 filed on Mar. 10, 2014, the contents of all of which are incorporated herein by reference in their entirety.

TECHNICAL FIELD

The present invention relates to an apparatus, a system and a method for DC (Dual Connectivity) or SCE (Small Cell Enhancement), and particularly to a technique to secure handover in DC.

BACKGROUND ART

The SCE or DC was defined in 3GPP (3rd Generation Partnership Project) RAN (Radio Access Network) working groups, and it has initiated a study on security aspect and impact on the architecture 1A defined in NPL 1.

An UE (User Equipment) in DC is connected to both MeNB (Master eNB (evolved Node B)) and SeNB (Secondary eNB). Since there is only one S1-MME connection in the DC architecture which is between MeNB and MME (Mobility Management Entity), the handover means handover of MeNB. When a handover happens, it was agreed that SeNB should be torn down first as disclosed in NPLs 2 to 4.

CITATION LIST

Non Patent Literature

NPL 1: 3GPP TR 36.842, "Study on Small Cell enhancements for E-UTRA and E-UTRAN; Higher layer aspects (Release 12)", V12.0.0, 2013-12
NPL 2: S3-140211, 3GPP TSG SA WG3 (Security) Meeting #74
NPL 3: S3-140209, 3GPP TSG SA WG3 (Security) Meeting #74
NPL 4: S3-140210, 3GPP TSG SA WG3 (Security) Meeting #74

SUMMARY OF INVENTION

Technical Problem

However, the inventors of this application have found that in the current solution, there are the following problems 1) to 3).

1) SeNB Release in Handover:
   There is no solution how MeNB should perform SeNB Release procedure during handover. Doing it too early or too late will both cause some issues as given below.
   a. If the SeNB Release happens too early for example just after (source) MeNB sends Handover Request message to target MeNB (hereinafter, sometimes referred to as "M'eNB"), it may have to configurate a SeNB (either a new one or the same one, hereinafter, sometimes referred to as "S'eNB") by performing SeNB Addition procedure, if a failure message is received from M'eNB. This may burden MeNB, control plane signaling, and counter value increasement problem.
   b. If the SeNB Release happens too late for example after the handover procedure is complete and bearers between MeNB and UE are released, the packet data transmission via SeNB will continue and M'eNB will have no knowledge about the SeNB. The bearer will be kept and this is a resource depletion and opens to potential security vulnerabilities.
2) SeNB Addition in Handover:
   There is no solution on how to configure a S'eNB by the M'eNB. First, in order to configure a S'eNB, the M'eNB should have knowledge which S'eNBs are potentially available. Such information can be retrieved from the UE measurement report for handover. By doing this it can reduce the potential interaction with UE. Second if S'eNB Addition happens too late in the handover procedure or much later after handover, the M'eNB will be overloaded and it may increase the RRC (Radio Resource Control) signaling.
3) Security Key Management for the SeNB and S'eNB are not Defined, which Includes the Security Context for SeNB and New Security Context for S'eNB.
   Accordingly, an exemplary object of the present invention is to provide a solution for solving at least one of the above-mentioned problems.

Solution to Problem

The present invention proposes solution to the above described problems. Each of an apparatus, a system and a method according to exemplary aspects of the present invention gives more details on X2 handover procedure and security for support dual connectivity.

According to first exemplary aspect of the present invention, there is provided a mobile communication system supporting dual connectivity. This system includes: a source MeNB (Master evolved Node B); a source SeNB (Secondary evolved Node B); and a UE (User Equipment) that connects to the source MeNB and the source SeNB. The source MeNB sends information on the source MeNB and information on the source SeNB in a Handover Request to a target MeNB. The target MeNB sends a Handover Request Acknowledge to the source MeNB.

According to second exemplary aspect of the present invention, there is provided a communication method for dual connectivity having a source MeNB (Master evolved Node B) and a source SeNB (Secondary evolved Node B). This method includes: sending information on the source MeNB and information on the source SeNB in a Handover Request from the source MeNB to a target MeNB; and sending a Handover Request Acknowledge from the target MeNB to the source MeNB.

According to third exemplary aspect of the present invention, there is provided a base station used in dual connectivity. This base station includes: sending means for sending information on the base station and information on a secondary base station for dual connectivity in a Handover Request to a target base station; and receiving means for receiving a Handover Request Acknowledge from the target base station.

According to fourth exemplary aspect of the present invention, there is provided a base station used in dual connectivity. This base station includes: sending means for sending a Path Switch Request with information on a source secondary base station or information on dual connectivity to an MME (Mobility Management Entity).

Advantageous Effects of Invention

According to the present invention, it is possible to solve at least one of the above-mentioned problems.

BRIEF DESCRIPTION OF DRAWINGS

FIG. 1 is a block diagram showing a configuration example of a system according to a n exemplary embodiment of the present invention.

FIG. 2 is a flowchart diagram showing a first example of SeNB change in Handover flow according to the exemplary embodiment.

FIG. 3 is a flowchart diagram showing a second example of SeNB change in Handover flow according to the exemplary embodiment.

FIG. 4 is a flowchart diagram showing a third example of SeNB change in Handover flow according to the exemplary embodiment.

FIG. 5 is a sequence diagram showing one example of S'-KeNB derivation in the system according to the exemplary embodiment.

FIG. 6 is a sequence diagram showing another example of S'-KeNB derivation according to the exemplary embodiment.

FIG. 7 is a sequence diagram showing a part of an example of Handover procedure according to the exemplary embodiment.

FIG. 8 is a sequence diagram showing the remaining part of the example of Handover procedure according to the exemplary embodiment.

FIG. 9 is a block diagram showing a configuration example of a source MeNB according to the present invention.

FIG. 10 is a block diagram showing a configuration example of a target MeNB according to the present invention.

DESCRIPTION OF EMBODIMENTS

Hereinafter, an exemplary embodiment of an apparatus, a system and a method according to the present invention, will be described with the accompanying drawings.

This exemplary embodiment is based on the following assumptions:

1) Each UE can connect to one MeNB and maximum one SeNB as in the current architecture (see NPL 1); and 2) SA3 agreement that SeNB connection is torn down before a new SeNB is added.

The architecture is depicted in FIG. 1. As shown in FIG. 1, a system according to this exemplary embodiment includes a UE 10, MeNBs 20_1 and 20_2, SeNBs 30_1 and 30_2, an MME 40, and an S-GW (Serving Gateway) 50.

There are provided interfaces for C-Plane (Control-Plane) signaling between the MME and the MeNB, between the MeNB and the SeNB, between the MeNB and the UE. Note that the C-Plane interface does not exist between the SeNB and the MME, and between the SeNB and the UE. Moreover, there are also provided interfaces for U-Plane (User-Plane) communication between the S-GW and each eNB, between the MeNB and the SeNB, between the UE and each eNB. In this architecture, U-Plane traffic between the UE and the S-GW is transmitted through the MeNB and the SeNB in parallel for the purpose of offloading the MeNB (in other words, for the purpose of offloading the backhaul interface between the MeNB and the S-GW).

As shown by an arrow line in FIG. 1, the UE 10 is handed from the source MeNB 20_1 over to the target MeNB (hereinafter, referred to as "M'eNB") 20_2, during which the SeNB 30_1 is changed to a new SeNB (hereinafter, referred to as "S'eNB") 30_2. Although the SeNB 30_1 and the S'eNB 30_2 may be a same node, the SeNB 30_1 still needs to be release first from the MeNB 20_1 then configured by the M'eNB 20_2.

Figure 4:
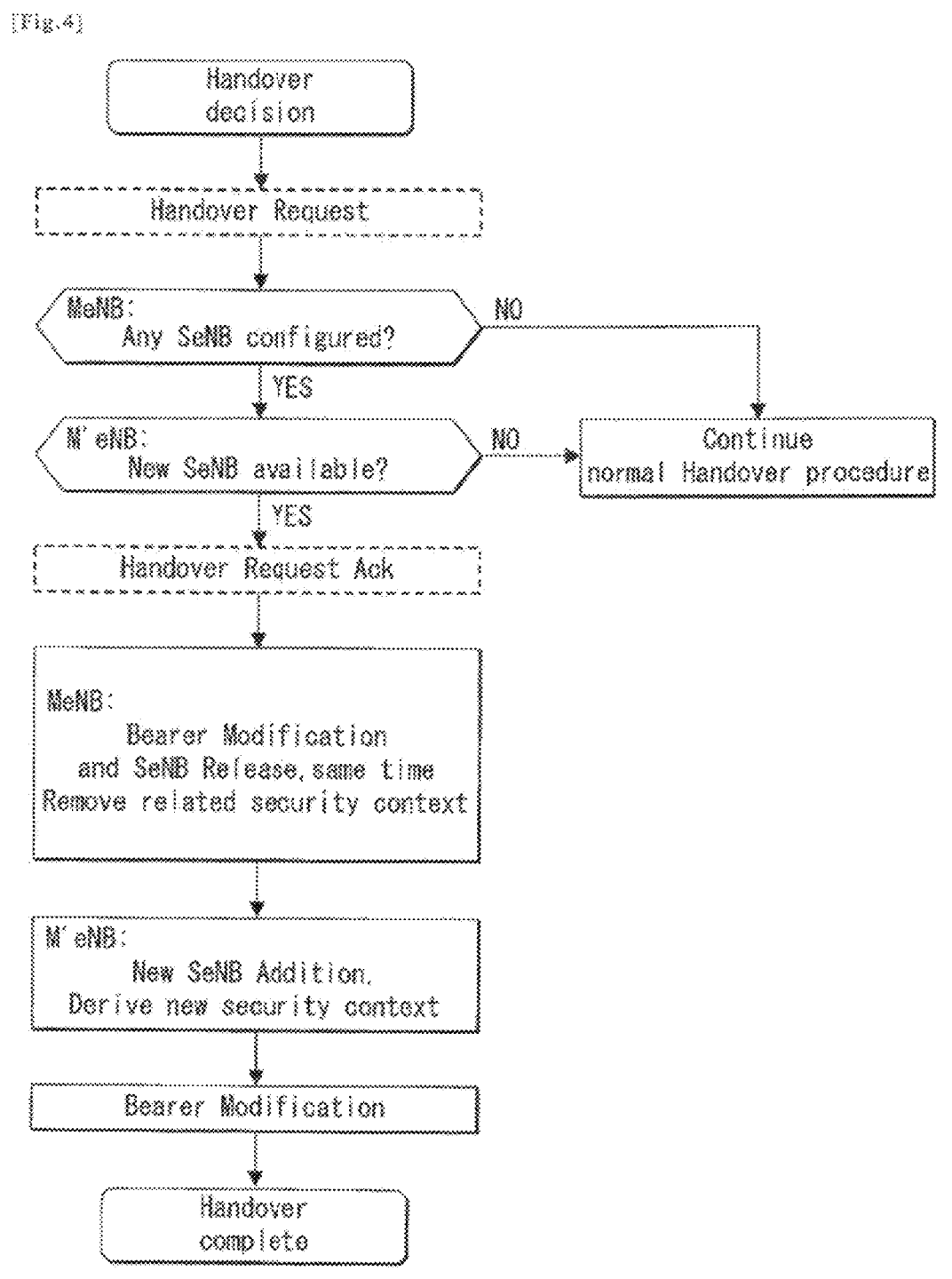

In the following sections 1 to 3, there will be described operation examples of this exemplary embodiment with reference to FIGS. 2 to 8.

1. High Level Handover Flow

This exemplary embodiment considers X2-handover (based on the procedure in 3GPP TS 36.300, Clause 10.1.2.1). As mentioned above, target eNB is denoted as M'eNB and the newly configured SeNB is denoted as S'eNB in this exemplary embodiment. The scenario is given below, with reference to FIG. 2.

After handover Decision is made at Source MeNB, it perform SeNB release (as described in 3GPP TR 36.842, Annex G.2) including the RRC Connection Reconfiguration and bearer modification, to: 1) inform UE not to send any UL packet to the SeNB anymore; and 2) inform S-GW not to send any DL packet to SeNB anymore. If resources of S'eNB are available, M'eNB initiates the S'eNB Addition procedure as in 3GPP TR 36.842, Annex G.1 to configure the new S'eNB. For any packet SeNB still holds, it should forward them to MeNB. Since the Handover Request and Handover Request Ack may be at different timing, they are shown in dotted boxes.

There are other variations to perform SeNB release, SeNB Addition and Bearer Modification, as shown in FIGS. 3 and 4.

In the variation shown in FIG. 3, the MeNB performs Bearer Modification towards S-GW first then follows SeNB Release procedure.

In the variation shown in FIG. 4, the MeNB performs Bearer Modification, SeNB Release procedure, and the RRC Connection Reconfiguration (not shown in the flow chart) at the same time Details of the variation will be given in section 3.

2. Key Derivation in Handover Procedure

The SeNB that is configured by source MeNB should be released by the source MeNB, and a new SeNB (S'eNB) should be configured by the target MeNB (M'eNB) if available. A new key S-KeNB (S'-KeNB) should be derived for the communication protection between UE and SeNB.

There are two options of how the S'-KeNB and the counter are derived, i.e. at the source or target MeNB. The two options are depicted in FIGS. 5 and 6.

Note that the order of Handover Request/Handover Request Ack, SeNB release and SeNB Addition, and RRC-ConnectionReconfiguration procedures may happen in different order, which will be shown in the next section 3.

<S'-KeNB Derivation Option 1>

As shown in FIG. 5, the MeNB 20_1 derives the S'-KeNB from the KeNB* for handover and generates a counter associates to the KeNB* (step S12). The MeNB 20_1 sends the keys and counter to the M'eNB 20_2, the M'eNB 20_2 keeps the counter and sends the S'-KeNB to the S'eNB 30_2 (steps S13, S14 and S17). The MeNB 20_1 can send the Counter and KSI (Key Set Identifier) to the UE 10 in the RRCConnectionReconfiguration message (step S15).

<S'-KeNB Derivation Option 2>

As shown in FIG. 6, the M'eNB 20_2 derives the S'-KeNB from the KeNB* it received from the MeNB 20_1 in Handover Request message, and generates a counter associates to the KeNB* (step S24). The M'eNB 20_2 sends the S'-KeNB to the S'eNB 30_2 (step S27). The M'eNB 20_2 sends the Counter and KSI to the UE 10 in the RRCConnectionReconfiguration message (step S25).

3. Handover Procedure

The SeNB Release, SeNB Addition and Bearer Modification can happen in a different order during handover procedure, in this exemplary embodiment the variations, the advantage in each case are given.

The first variation is depicted in FIGS. 7 and 8. Note that other variations will be given in text.

The new steps are given below:

In Step S32 shown in FIG. 7, in the Measurement Reports that the UE 10 sends to the MeNB 20_1, it includes the measurement report on potential S'eNB as well.

In Step S34, as S'-KeNB derivation option 1, the MeNB 20_1 derives S'-KeNB from the KeNB* and generates a counter associates to the K*eNB.

In Step S35, the MeNB 20_1 includes Measurement Reports (optl. S'-KeNB, counter) in Handover Request. Note that the KeNB* is also sent in this message. The counter can also be generated at the M'eNB 20_2.

In Step S36, the M'eNB 20_2 determines whether and which S'eNB to configure in Admission Control.

In Step S39, the MeNB 20_1 performs SeNB Release procedure. The MeNB 20_1 and the SeNB 30_1 should remove the SeNB security context for the given UE 10.

In Step S40, the SeNB 30_1 forwards the buffered packets to the MeNB 20_1.

In Step S41, in the message of RRCConnectionReconfiguration, the MeNB 20_1 should inform the UE 10 about the SeNB Release such that the UE 10 will remove the related SeNB security context. In case of S'-KeNB derivation option 1, the MeNB 20_1 also includes the counter and KSI.

In Step S42, then the UE 10 sends RRCConnectionReconfiguration Complete to the MeNB 20_1.

In Step S43, the MeNB 20_1 starts the Bearer Modification procedure. The MeNB 20_1 should include the details about the SeNB 30_1 to be released including the DRB (Data Radio Bearer) information, SeNB ID and SeNB IP address.

In Step S44, the M'eNB 20_2 starts the SeNB Addition to configure the new SeNB (S'eNB 30_2). This can also happen after step S51 shown in FIG. 8, the former can make S'eNB already offload M'eNB, the latter can save resource if HO fails.

In Step S45, as S'-KeNB derivation option 2, the M'eNB 20_2 derives S'-KeNB and generates the Counter, it sends the S'-KeNB to the S'eNB 30_2. Then, the M'eNB 20_2 sends the RRCConnectionReconfiguration to the UE 10.

In Step S46, the M'eNB 20_2 sends the S'-KeNB and KSI to the S'eNB 30_2 in the same way as for SeNB Addition procedure.

In Step S47, the M'eNB 20_2 sends the RRCConnectionReconfiguration to the UE 10 via the MeNB 20_1. This is to inform the UE 10 that the S'eNB 30_2 is been configured. For S'-KeNB derivation option 2, it includes the Counter and KSI.

In Step S52 shown in FIG. 8, the M'eNB 20_2 sends Path Switch Request to the MME 40. Besides the parameters for handover, the message should also include the newly added S'eNB information i.e. DC configuration information (contains the configured DRB information, SeNB ID and SeNB IP address.

In Step S53, the MME 40 forwards the DC configuration information in Modify Bearer Request to the S-GW 50.

The MME 40 (after Step S52) or the S-GW 50 (at Step S54) performs the eNB verification to: 1) verify whether MeNB is allowed to configure the SeNB for the given UE; 2) verify whether SeNB is a valid network element; 3) verify whether SeNB is authorized to provide dual connectivity; and 4) confirm whether this is a Dos (Denial of Service) attack. When the verification is done at the MME 40 it should be after the MME 40 receives Step S52 Path Switch Request message. When the verification is done at the S-GW 50, it should happen after it receives the Step S53 Modify Bearer Request message from the MME 40.

Other Variations

As described above that the order of SeNB Release, SeNB Addition can be different during the handover. Here the other variations are described.

Variation 1

Current Step S39 SeNB Release can be carried after Step S43 Bearer Modification.

According to this variation, the UE 10 and the S-GW 50 can be informed as earlier as possible when the MeNB 20_1 is determined to perform SeNB Release.

Variation 2

After step S39, Step S41 and Step S43 can be performed the same time.

According to this variation, it is to inform both of the UE 10 and the S-GW 50 in time, such that they will not send any more packet.

Variation 3

Step S47 RRCConnectionReconfiguration from the M'eNB 20_2 to the UE 10, can be sent directly to the UE 10 after the "Detach from old cell and synchronize to new cell".

Next, there will be described configuration examples of the MeNB (source MeNB) 20_1 and the M'eNB (target MeNB) 20_2 with reference to FIGS. 9 and 10, respectively.

As shown in FIG. 9, the MeNB (source MeNB) 20_1 includes at least a sending unit 101 and a receiving unit 102. The sending unit 101 sends, to the M'eNB (target MeNB) 20_2, information on the MeNB 20_1 and information on the SeNB 30 for dual connectivity in the Handover Request. The receiving unit 102 receives, from the M'eNB 20_2, the Handover Request Acknowledge. Note that these units 101 and 102 as well as other element(s) of the MeNB 20_1 can be implemented by at least hardware such as a transceiver which conducts communication with the M'eNB 20_2, the SeNB 30, the MME 40 and the S-GW 50, a transceiver which conducts wireless communication with the UE 10, as well as a controller like a CPU (Central Processing Unit) which control these transceivers to execute the processes shown in each of FIGS. 2 to 8 or processes equivalent thereto. The MeNB 20_1 can also be implemented by the combination of such hardware, and software (e.g., a program as stored in a memory and executed by the CPU). Moreover, as mentioned above, the MeNB 20_1 may also send, to the UE 10, the RRC Connection Reconfiguration about release of the SeNB 30.

As shown in FIG. 10, the M'eNB (target MeNB) 20_2 includes at least a sending unit 201. The sending unit 201 sends, to the MME 40, the Path Switch Request with information on the SeNB 30 or information on dual connectivity. The M'eNB 20_2 may also include a receiving unit 202. The receiving unit 202 receives, from the MeNB (source MeNB) 20_1, information on the MeNB 20_1 and information on the SeNB 30 for dual connectivity in the Handover Request. Note that these units 201 and 202 as well as other element(s) of the M'eNB 20_2 can be implemented by at least hardware such as a transceiver which conducts communication with the MeNB 20_1, the SeNB 30, the MME 40 and the S-GW 50, a transceiver which conducts wireless communication with the UE 10, as well as a controller like a CPU which control these transceivers to execute the processes shown in each of FIGS. 2 to 8 or processes equivalent thereto. The M'eNB 20_2 can also be implemented by the combination of such hardware, and software (e.g., a program as stored in a memory and executed by the CPU).

Note that the present invention is not limited to the above-mentioned exemplary embodiment, and it is obvious that various modifications can be made by those of ordinary skill in the art based on the recitation of the claims.

The whole or part of the exemplary embodiment disclosed above can be described as, but not limited to, the following supplementary notes.

Supplementary Note 1

A UE that provides the potential S'eNB information enclosed in the measurement reports,
wherein the information can be forwarded from an MeNB to an M'eNB such that the M'eNB can determine, before the handover happens, whether the M'eNB will configure a new SeNB (S'eNB) and which S'eNB the M'eNB will configure.

Supplementary Note 2

A system in which a key S'-KeNB is derived by:
a) as option 1, after the HO decision, an MeNB derives the S'-KeNB and sends it to an M'eNB in Handover Request message, because a key KeNB* is already derived and sent in the message, so the MeNB can derive the S'-KeNB from the KeNB* and send the S'-KeNB in the same message; or
b) as option 2, the MeNB informs the M'eNB the measurement reports on S'eNB in Handover Request, so that the M'eNB can know which S'eNB can be configured, wherein the M'eNB performs the S'eNB Addition procedure and derives the S'-KeNB from the KeNB* received from the MeNB, generates the counter and sends the S'-KeNB to the S'eNB.

Supplementary Note 3

A system in which SeNB Release and Bearer Modification are performed as:
a) SeNB Release can be performed when an MeNB receives Handover Request Ack from an M'eNB, such that an SeNB and a UE will not continue their communication, thereby can prevent packet loss since the SeNB is not configured in M'eNB; or
b) SeNB Release can be performed after Bearer Modification or the same time such that an S-GW and the UE can be informed in time about the SeNB to prevent them sending packet and also prevent packet loss.

Supplementary Note 4

An M'eNB that performs S'eNB Addition procedure after Handover Request Ack, to ensure that the handover is complete and an SeNB is torn down.

Supplementary Note 5

A system in which an MME or an S-GW performs M'eNB and S'eNB verification as for SeNB Addition.

Supplementary Note 6

A system in which RRCConnectionReconfiguration procedure is changed, from current procedure to a new procedure,
wherein the current procedure has a round-trip from a Source eNB to UE and from the UE to a Target eNB,
wherein the new procedure has a round-trip between the Source MeNB and the UE, and a round-trip between an M'eNB and the UE, because the UE needs to be informed about SeNB Release, and S'eNB Addition.

Supplementary note 7

A system in which Update Path Switch Request message carries information of the newly configured S'eNB, i.e. DC configuration information (contains the configured DRB information, SeNB ID and SeNB IP address).

This application is based upon and claims the benefit of priority from Japanese patent application No. 2014-046158 filed on Mar. 10, 2014, the disclosures of which is incorporated herein in its entirety by reference.

REFERENCE SIGNS LIST

10 UE
20 MeNB
30 SeNB
40 MME
50 S-GW
101, 201 SENDING UNIT
102, 202 RECEIVING UNIT

What is claimed is:
1. A User Equipment (UE) comprising:
at least one memory storing instructions; and
at least one processor configured to execute the instructions to:
connect to a source Master Node (MN) and a source Secondary Node (SN) before a handover from the source MN to a target MN,
connect to the target MN and a target SN after the handover from the source MN to the target MN,
receive, from the source MN, an RRCConnectionReconfiguration message including a first identifier of a set of information related to a security,
send an RRCConnectionReconfiguration complete message to the target MN for sending a second identifier of the set of information to the target SN, and
report measurement information to the source MN.

2. The UE according to claim 1 further comprising the at least one processor configured to execute the instructions to delete a security context when the source MN releases the source SN at the handover.

3. A communication method of a User Equipment (UE), the method comprising:

connecting to a source Master Node (MN) and a source Secondary Node (SN) before a handover from the source MN to a target MN;

connecting to the target MN and a target SN after the handover from the source MN to the target MN;

receiving, from the source MN, an RRCConnectionReconfiguration message including a first identifier of a set of information related to a security;

sending an RRCConnectionReconfiguration complete message to the target MN for sending a second identifier of the set of information to the target SN, and reporting measurement information to the source MN.

4. The communication method according to claim 3 further comprising, deleting a security context when the source MN releases the source SN in the handover from the source MN to the target MN.

* * * * *